United States Patent
Uefuji et al.

(10) Patent No.: US 9,459,388 B2
(45) Date of Patent: Oct. 4, 2016

(54) MULTI-LAYERED OPTICAL FILM AND METHOD FOR PRODUCING THE SAME

(71) Applicant: NALUX CO., LTD., Osaka-shi, Osaka (JP)

(72) Inventors: Hiroaki Uefuji, Osaka (JP); Yasuaki Inoue, Osaka (JP)

(73) Assignee: NALUX CO., LTD., Osaka (JP)

( * ) Notice: Subject to any disclaimer, the term of this patent is extended or adjusted under 35 U.S.C. 154(b) by 736 days.

(21) Appl. No.: 13/649,399

(22) Filed: Oct. 11, 2012

(65) Prior Publication Data

US 2013/0176615 A1    Jul. 11, 2013

(30) Foreign Application Priority Data

Jan. 10, 2012   (WO) ............... PCT/JP2012/050234

(51) Int. Cl.
*G02B 5/28* (2006.01)
*G02B 1/113* (2015.01)

(52) U.S. Cl.
CPC ............. *G02B 5/283* (2013.01); *G02B 1/113* (2013.01); *G02B 5/28* (2013.01)

(58) Field of Classification Search
CPC ............ G02B 1/10–1/18; G02B 5/28–5/289; G02B 5/02–5/0294; G02B 5/08–5/0891; G02B 5/26–5/265
USPC .................. 359/350–361, 577–590
See application file for complete search history.

(56) References Cited

U.S. PATENT DOCUMENTS 3,604,784 A * 9/1971 Louderback ........... G02B 1/115
                                                    359/586
4,988,164 A * 1/1991 Ichikawa ............... G02B 1/115
                                                    359/580
5,282,084 A * 1/1994 Hatano ...................... 359/360
2002/0060848 A1* 5/2002 Mitsuishi ............... G02B 1/115
                                                    359/586

(Continued)

FOREIGN PATENT DOCUMENTS

CN          101910872 A      12/2010
CN          102029739 A      4/2011

(Continued)

OTHER PUBLICATIONS

International Search Report dated Feb. 7, 2012 corresponding to International Patent Application No. PCT/JP2012/050234.

(Continued)

*Primary Examiner* — Bumsuk Won
*Assistant Examiner* — Jeffrey Madonna
(74) *Attorney, Agent, or Firm* — Squire Patton Boggs (US) LLP

(57) ABSTRACT

A multi-layered optical film formed on a plastic substrate, which has high resistance against lights in the ultraviolet region including blue lasers in a high ambient temperature is disclosed. Each layer of the multi-layered optical film is made of an oxide or an oxynitride, layers adjacent to each other are made of materials having different refractive indexes, oxidation-reduction potential of elements constituting oxides or oxynitrides is −0.9 volts or less, thickness of a first layer adjacent to the substrate is 10 nanometers or more, an absolute value of a difference in refractive index between a material of the substrate and a material of the first layer is 0.2 or less, an absolute value of a difference in refractive index between two kinds of materials of layers adjacent to each other is 0.45 or less and total thickness of the multi-layered optical film is 3000 nanometers or less.

10 Claims, 8 Drawing Sheets

(56) References Cited

U.S. PATENT DOCUMENTS

| | | | |
|---|---|---|---|
| 2008/0192349 A1* | 8/2008 | Inoue | G02B 1/105 359/581 |
| 2009/0219620 A1* | 9/2009 | Yamada | G02B 1/115 359/586 |
| 2009/0252862 A1 | 10/2009 | Inoue | |
| 2010/0271703 A1* | 10/2010 | Nakabayashi | 359/581 |
| 2011/0194181 A1* | 8/2011 | Takahashi | C23C 14/086 359/585 |
| 2014/0285896 A1* | 9/2014 | Hisamitsu | G02B 5/0841 359/584 |

FOREIGN PATENT DOCUMENTS

| | | |
|---|---|---|
| JP | 2007-121391 A | 5/2007 |
| JP | 4178190 B2 | 9/2008 |
| JP | 2010-181902 A | 8/2010 |
| WO | WO 2008/023802 A1 | 2/2008 |

OTHER PUBLICATIONS

International Search Report dated Apr. 28, 2011 corresponding to International Patent Application No. PCT/JP2012/050234.

Chinese Office Action dated May 4, 2015 corresponding to Chinese Patent Application Application No. 201280066085.2.

\* cited by examiner

MULTI-LAYERED OPTICAL FILM AND METHOD FOR PRODUCING THE SAME

FIELD OF THE INVENTION

The present invention relates to a multi-layered optical film which imparts to optical elements a high resistance against lights in the ultraviolet region including blue lasers in a high ambient temperature and a method for producing the same.

BACKGROUND ART

Generally, transmittance of plastics is very low for lights having a wavelength less than 300 nanometers, and therefore plastics cannot be used for such lights. On the other hand, deterioration of plastics due to lights having a wave length greater than 450 nanometers is negligible. Accordingly, a resistance of plastics against lights having a wavelength from 300 nanometers to 450 nanometers is significant. In the present text of specification, lights having a wavelength from 300 nanometers to 450 nanometers are also referred to as lights in the ultraviolet region including blue lasers.

Thus, plastics are likely to be damaged by lights having a wavelength from 300 nanometers to 450 nanometers. This means that they have a low resistance for such lights. Accordingly, in optical devices used with lights in the ultraviolet region including blue lasers, optical elements made of glass are mainly used.

On the other hand, a multi-layered optical film is often formed on a surface of an optical element of optical devices for the purpose of anti-reflection or the like. A method for producing an optical element provided with a multi-layered optical film which imparts to the element a resistance against lights in the ultraviolet region including blue lasers has been developed (JP4178190). However, a multi-layered optical film which imparts to an optical element a high resistance against lights in the ultraviolet region including blue lasers even in a high ambient temperature has not been developed.

Accordingly, there is a need for a multi-layered optical film which imparts to an optical element a high resistance against lights in the ultraviolet region including blue lasers even in a high ambient temperature.

SUMMARY OF THE INVENTION

A multi-layered optical film according to the first aspect of the present invention is formed on a plastic substrate. Each layer of the multi-layered optical film is made of an oxide or an oxynitride. Layers adjacent to each other are made of materials having different refractive indexes. Oxidation-reduction potential of elements constituting oxides or oxynitrides is −0.9 volts or less. Thickness of a first layer adjacent to the substrate is 10 nanometers or more. An absolute value of a difference in refractive index between a material of the substrate and a material of the first layer is 0.2 or less. An absolute value of a difference in refractive index between two kinds of materials of layers adjacent to each other is 0.45 or less. Total thickness of the multi-layered optical film is 3000 nanometers or less.

The multi-layered optical film according to the present aspect will restrain chemical reactions due to lights in the ultraviolet region including blue lasers and will enhance resistance against lights in the ultraviolet region including blue lasers of the optical element.

In a multi-layered optical film according to the first embodiment of the first aspect of the present invention, material with the highest refractive index among materials constituting the multi-layered optical film includes one of aluminium, lanthanum, gadolinium, zirconium, calcium, cerium, europium, hafnium, magnesium, niobium, scandium, yttrium and ytterbium.

In a multi-layered optical film according to the second embodiment of the first aspect of the present invention, material constituting the first layer of the multi-layered optical film includes silicon or aluminium.

A multi-layered optical film according to the third embodiment of the first aspect of the present invention includes two kinds of materials.

A multi-layered optical film according to the fourth embodiment of the first aspect of the present invention includes three kinds of materials.

In a multi-layered optical film according to the fifth embodiment of the first aspect of the present invention, total thickness of the multi-layered optical film is 240 nanometers or more.

A multi-layered optical film according to the second aspect of the present invention is formed on a plastic substrate, and has resistance against lights in the ultraviolet region including blue lasers in an ambient temperature of 75° C. Each layer of the multi-layered optical film is made of an oxide or an oxynitride. Layers adjacent to each other are made of materials having different refractive indexes. Oxidation-reduction potential of elements constituting oxides or oxynitrides is −0.9 volts or less. Thickness of a first layer adjacent to the substrate is 10 nanometers or more. An absolute value of a difference in refractive index between a material of the substrate and a material of the first layer is 0.2 or less. An absolute value of a difference in refractive index between two kinds of materials of layers adjacent to each other is 0.45 or less. Total thickness of the multi-layered optical film is 3000 nanometers or less.

The multi-layered optical film according to the present aspect will impart resistance against lights in the ultraviolet region including blue lasers in an ambient temperature of 75° C. to an optical element.

In a method for forming a multi-layered optical film on a plastic substrate according to the third aspect of the invention, the multi-layered optical film includes at least one kind of pair of layers in which a layer made of a material having a higher refractive index and a layer made of a material having a lower refractive index are alternately stacked, each layer of the multi-layered optical film is made of an oxide or an oxynitride, oxidation-reduction potential of elements constituting oxides or oxynitrides is −0.9 volts or less, thickness of a first layer adjacent to the substrate is 10 nanometers or more, an absolute value of a difference in refractive index between a material of the substrate and a material of the first layer is 0.2 or less, an absolute value of a difference between the higher refractive index and the lower refractive index is 0.45 or less and total thickness of the multi-layered optical film is 3000 nanometers or less. The method includes the steps of determining materials, thickness and the number of the layers in the above-described conditions in such a way that the multi-layered optical film has a required optical performance; and adjusting the determined materials, thickness and the number of the layers in the above-described conditions in such a way that the multi-layered optical film has a required resistance against lights in the ultraviolet region including blue lasers in an ambient temperature of 75° C.

MODE FOR CARRYING OUT THE INVENTION

Figure 1:
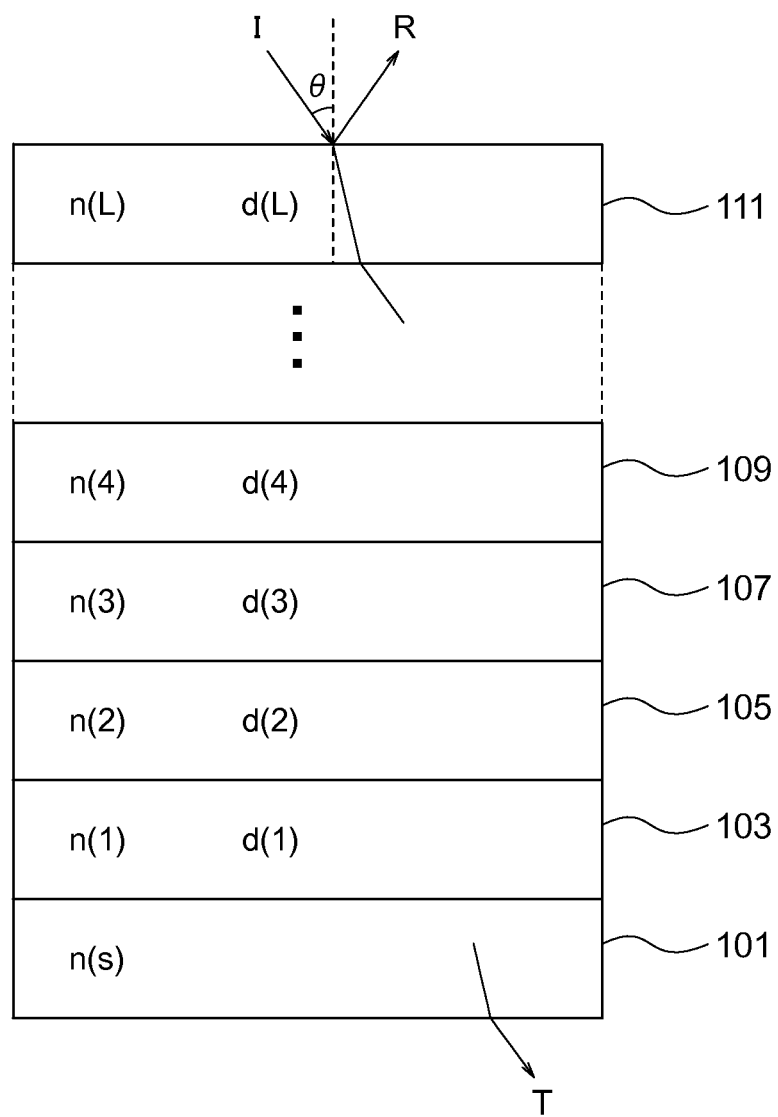
FIG. 1 shows an example of a structure of a multi-layered optical film formed on a substrate.

FIG. 1 shows an example of a structure of a multi-layered optical film formed on a substrate. A plurality of layers 103, 105, 107, 109, and 111 which are made of two or more materials are formed on a plastic substrate 101. Interference of lights is generated by a multi-layered optical film using two or more materials. Using the interference, a transmittance or a reflectance can be appropriately controlled to realize a multi-layered optical film for anti-reflection, a multi-layered optical film for an optical filter, a multi-layered optical film for reflection and the like.

In FIG. 1, the number of the layers of the multi-layered optical film is L. How to determine the number of layers will be described later. In general, when the total thickness of a multi-layered optical film formed on an optical element is 3000 nanometers or less, an influence of multi-layered optical film on the other optical characteristics of the optical element is negligible.

Figure 2:
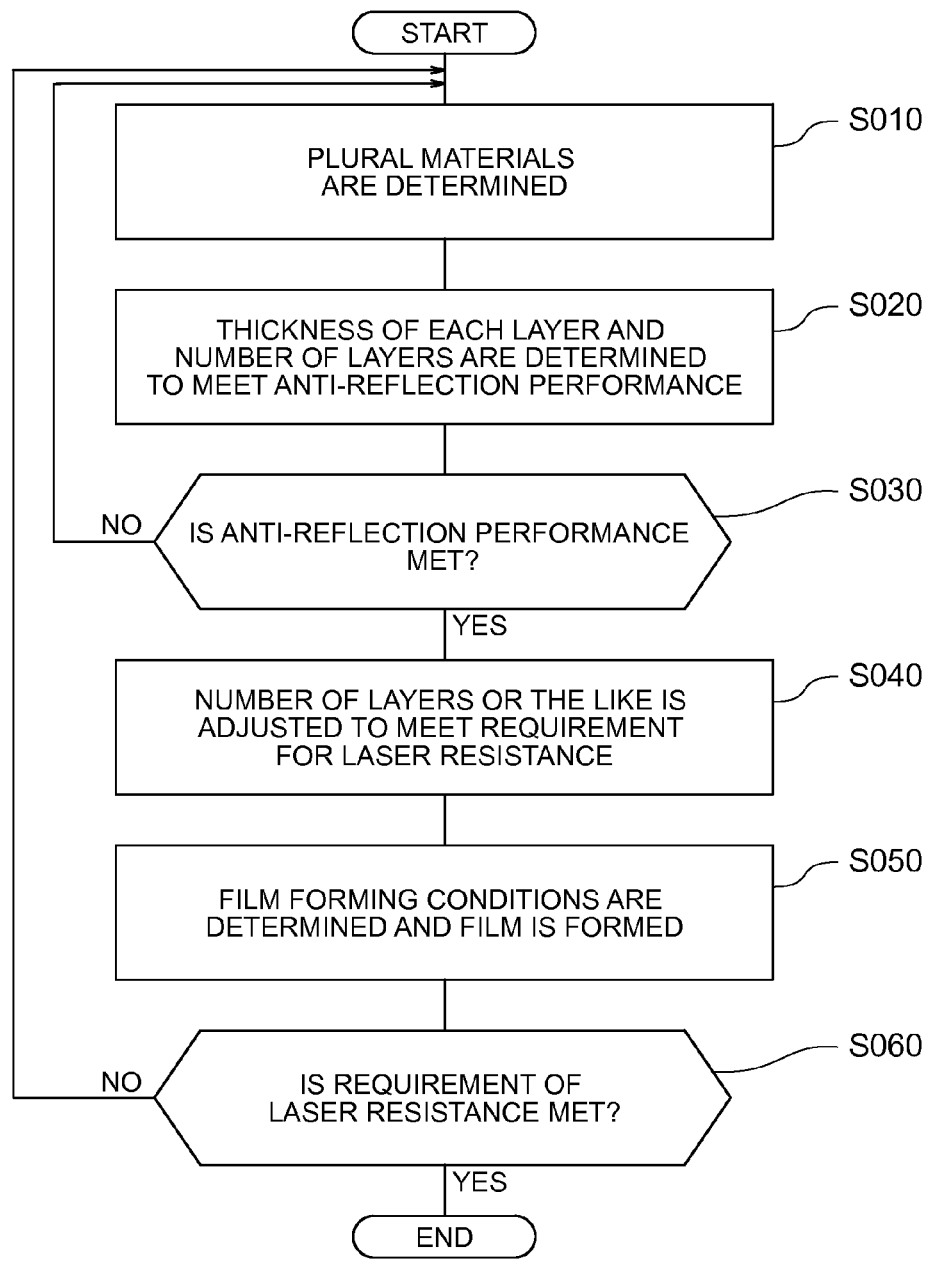
FIG. 2 is a flowchart for illustrating a method for designing a multi-layered optical film for anti-reflection according to an embodiment of the present invention.

FIG. 2 is a flowchart for illustrating a method for designing a multi-layered optical film for anti-reflection according to an embodiment of the present invention. In the present embodiment, the multi-layered optical film for anti-reflection will be described as an example. Multi-layered optical films for optical filters and for reflection can be designed in similar ways.

In step S010 of FIG. 2, plural materials are determined. How to determine the plural materials will be described later.

In step S020 of FIG. 2, thickness of each layer and the number of layers are determined to meet the performance specifications of anti-reflection.

In FIG. 1, refractive index of substrate 101, that of layer 103, that of layer 105, and in general that of the j-th layer from the substrate side are represented respectively by n(s), n(1), n(2) and n(j). Further, thickness of the j-th layer from the substrate side is represented by d(j). Optical characteristics of the multi-layered optical film can be represented by the following characteristic matrixes when light of wavelength λ is incident on the film at angle of incidence of θ. In FIG. 1, incident light, reflected light and transmitted light of the multi-layered optical film are represented respectively by I, R and T.

$$M = M(L) \cdot M(L-1) \ldots M(j) \ldots M(1) \quad (1)$$

M is a matrix of 2 by 2 and the matrix of each layer is also a matrix of 2 by 2. M(j) represents the matrix of the j-th layer and can be represented as below.

$$M(j) = \begin{bmatrix} \cos\delta(j) & i/n(j) \cdot \sin\delta(j) \\ i \cdot n(j) \cdot \sin\delta(j) & \cos\delta(j) \end{bmatrix} = \begin{bmatrix} A & i \cdot B \\ i \cdot C & D \end{bmatrix}$$

where $$\delta(j) = (2\pi/\lambda) \cdot (n(j) \cdot d(j) \cdot \cos\theta(j))$$

L represents the number of the layers of the multi-layered optical film as described above. Description of the symbols is below.

λ: Wavelength of incident light
n(s): Refractive index of the substrate
n(m) Refractive index of the medium
n(j): Refractive index of the j-th layer
d(j) Film thickness of the j-th layer
θ(j) Angle of incidence of incident light on j-th layer Further, reflectance (R) and transmittance (T) of the multi-layered optical film can be obtained by the following equations.

$$R = \frac{(n(m) \cdot A - n(s)D)^2 + (n(m) \cdot n(s)B - C)^2}{(n(m) \cdot A + n(s)D)^2 + (n(m) \cdot n(s)B + C)^2}$$

$$T = \frac{4n(m)^2}{(n(m) \cdot A + n(s)D)^2 + (n(m) \cdot n(s)B + C)^2}$$

In designing a multi-layered optical film, the wavelength of light to be used, the angle of incidence of light and the optical characteristics (reflectance and transmittance) are determined by the required performance specifications. Accordingly, when designing a multi-layered optical film, a plurality of materials of the layers, thickness of each layer and the number of the layers are determined based on the theory described above and according to the required performance specifications in such a way that the optical characteristics (reflectance and transmittance) are realized.

A simple structure in which two kinds of layers having different refractive indexes are alternately stacked can advantageously reduce reflectance of the multi-layered optical film for anti-reflection as is evident from the above-described equation of reflectance.

In step S030 of FIG. 2, it is determined whether performance specifications for anti-reflection are met or not. If they are met, the process goes to step S040. If they are not met, the process returns to step S010.

In step S040 of FIG. 2, the number of the layers or the like is adjusted in such a way that a predetermined resistance against lights in the ultraviolet region including blue lasers can be obtained.

The multi-layered optical film according to the present invention is formed in such a way that the predetermined resistance against lights in the ultraviolet region including blue lasers can be obtained. Accordingly, the multi-layered optical film has to be formed in such a way that it performs the desired anti-reflection functions as well as it has the predetermined resistance against lights in the ultraviolet region including blue lasers.

In general, in a multi-layered optical film for anti-reflection, when materials of layers of the multi-layered optical film are determined, the number of layers can be increased without having a significant influence on the anti-reflection functions provided that the design is optimized. Further, resistance against lasers will increase with the whole thickness of the multi-layered optical film for anti-reflection (the total thickness). Accordingly, resistance against lasers can be enhanced by increasing the number of layers.

In step S050 of FIG. 2, film-forming conditions are determined and the film is formed. The film-forming method will be described later.

In step S060 of FIG. 2, it is determined whether the multi-layered optical film has the predetermined resistance against lasers or not. If the multi-layered optical film has the predetermined resistance against lasers, the process is finished. If it does not have the predetermined resistance against lasers, the process returns to step S010. Whether the multi-layered optical film has the predetermined resistance against lasers or not may be determined by an actual laser irradiation test in which a difference between wave aberration before the laser irradiation and that after the laser irradiation is obtained by measurement. Alternatively, reference multi-layered optical films of various layer materials and various values of layer thickness are prepared, for each of them a difference between wave aberration before the laser irradiation and that after the laser irradiation is previously measured and resistance against lasers of the concerned multi-layered optical film can be estimated based on the previously measured values of the reference multi-layered optical films.

The film-forming method, that is, a method for forming a multi-layered optical film will be described below. The multi-layered optical film is preferably formed by vacuum thin-film coating technologies such as an ion-plating method and a sputtering method. Multi-layered optical films formed by vacuum thin-film coating technologies are very dense and have a high resistance against lights. In the text of specification, by way of example, an ion-plating method will be described. The present invention can be applied to multi-layered optical films formed by any other methods, provided that the multi-layered optical films have similar properties.

Figure 3:
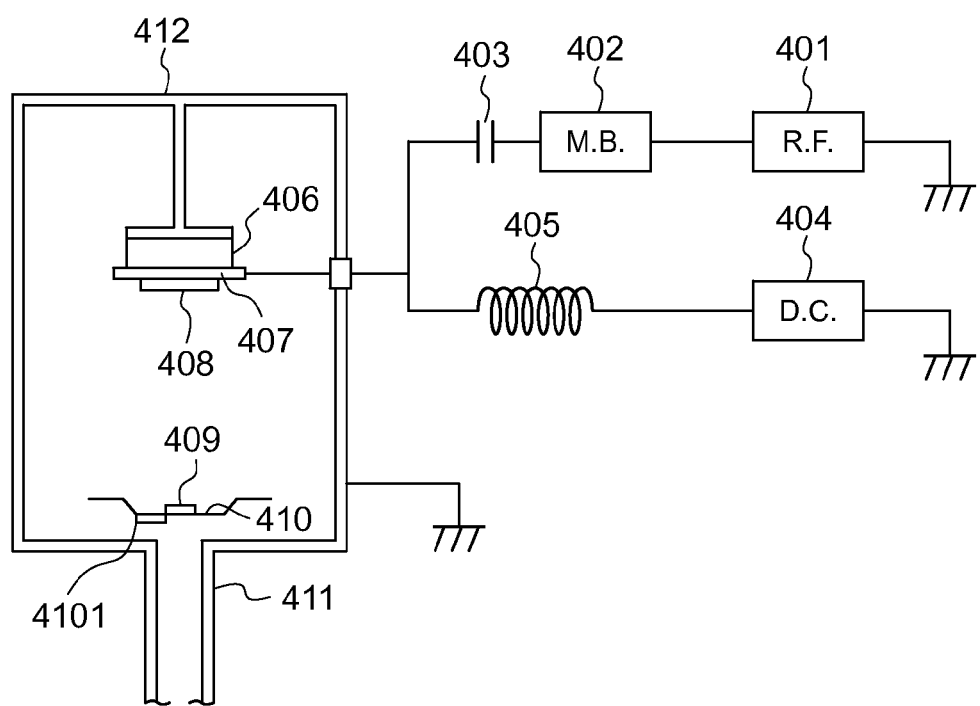
FIG. 3 is a diagram showing a configuration of an ion plating apparatus for carrying out the ion plating method.

FIG. 3 is a diagram showing a configuration of an ion plating apparatus for carrying out the ion plating method. The ion plating apparatus is disclosed in Japanese Patent Application Laid-Open No. 1-48347, for example. In a vacuum chamber 412, a substrate holder 407 consisting of a conductive material and supporting a substrate 408, and a support member consisting of a conductive material and supporting the substrate holder via an insulating member, constitute a capacitor 406.

A high-frequency power supply 401 is connected between the vacuum chamber 412 and the substrate holder 407 via a blocking capacitor 403 and a matching box 402 to apply a high-frequency voltage. A DC power supply 404 is connected between the vacuum chamber 412 and the substrate holder 407 via a choke coil 405 to apply a DC bias voltage such that the substrate holder 407 is on a negative side. By way of example, an output from the high-frequency power supply 401 is 500 W, and a voltage of the DC power supply 404 is 100 V.

An output from the high-frequency power supply 401 is preferably in the range from 300 to 900 W. In this range, an output value can be adjusted to enhance the denseness of the film.

The capacitor 406 operates together with the matching box 402 connected to the high-frequency power supply 401 which supplies a high-frequency voltage power into the vacuum chamber 412 to perform matching, and thus a stable electric field can be made and maintained between a material to be evaporated 409 on a resistor heating board 410 and the substrate 408. As a result, a thin film having high purity, high density, and high adhesiveness can be formed on the surface of the substrate 408.

An electron gun 4101 for electron beam heating is installed under a crucible including the resistor heating board 410.

Further, when forming the film, atmosphere gases such as oxygen gas and argon gas are fed into the vacuum chamber 412 thorough a valve which is not shown in FIG. 3. By way of example, when oxygen gas is fed, oxygen feeding pressure means a set value of oxygen pressure in the chamber. A value of oxygen partial pressure is preferably in the range from $3.0 \times 10^{-3}$ Pa to $5.0 \times 10^{-2}$ Pa. By adjusting the value of oxygen partial pressure in the above-described range, a change in wave aberration can be adjusted. Gasses in the vacuum chamber 412 are exhausted through an exhaust port 411.

Layers of plural evaporated materials 409 are successively formed on the plastic substrate 408 to form the multi-layered optical film. When forming a film, a highly dense film can be formed by appropriately setting values of high-frequency voltage and of atmosphere gas pressure. Specific set values of atmosphere gas pressure will be shown later.

How to determine plural materials by which the multi-layered optical film is formed will be described below. According to the new finding of the inventors of the present application, resistance against lights in the ultraviolet region including blue lasers of the multi-layered optical film remarkably varies on properties, particularly refractive indexes, of plural materials which constitute the multi-layered optical film. Accordingly, the plural materials which constitute the multi-layered optical film should be determined in consideration of properties, particularly refractive indexes, of the plural materials in such a way that resistance against lights in the ultraviolet region including blue lasers of the multi-layered optical film is enhanced to the extent as high as possible. Among others, as described in detail later, it has been found that a combination of materials of adjacent layers, which have different values of refractive index plays an essential role. Thus, the inventors of the present application have focused attention on refractive indexes of the plural materials which constitute the multi-layered optical film, not from the standpoint of optical characteristics such as reflectance and transmittance of the multi-layered optical film, but from the standpoint of resistance against lights of the multi-layered optical film. In this point, the finding of the inventors of the present application is quite novel.

Tables 1 to 11 show structures and typical film-forming conditions of multi-layered optical films No. 1 to No. 11 in which adjacent layers are made of materials having different refractive indexes in such a way that the multi-layered optical films have anti-reflection function. The substrate of multi-layered optical film 2 is made of glass. The substrates of the other 10 multi-layered optical films are made of plastic (cyclo-olefin polymer). Multi-layered optical films No. 1 to No. 8 have a structure in which layers made of two kinds of materials having different refractive indexes are alternately stacked. Multi-layered optical films No. 9 to No. 11 have a structure in which layers made of three kinds of materials are stacked. In multi-layered optical films No. 1 to No. 11, the material having the lowest refractive index is silicon dioxide (SiO2). As the material having the lowest refractive index, silicon monoxide or a mixture including silicon dioxide such as SixAly Oz (x, y and z represent positive numbers), can be used.

In Tables 1 to 11, values of refractive index are those at wavelength of 400 nanometers. Values of refractive index which are less than 1.5, values of refractive index which are 1.5 or more and less than 1.9 and values of refractive index which are 1.9 or more are grouped respectively as a lower refractive-index group, a medium refractive-index group and a higher refractive-index group. Refractive index of the glass for the substrate is 1.52 at wavelength of 400 nanometers. Refractive index of cyclo-olefin polymer for the substrates is 1.52 at wavelength of 400 nanometers.

TABLE 1

| Layer | Material of layer | Refractive index at 400 nm | Refractive index group | Difference in refractive index between adjacent layers | O2 feeding pressure (Pa) | Ar feeding pressure (Pa) | Layer-forming rate (Å/s) | Layer thickness (Å) (target) |
|---|---|---|---|---|---|---|---|---|
| 4th | SiO2 | 1.46 | Lower | 0.58 | none | 6.00E−03 | 10.0 | 600 |
| 3rd | Ta2O5 | 2.04 | Higher | −0.58 | 3.00E−02 | none | 3.0 | 700 |
| 2nd | SiO2 | 1.46 | Lower | 0.58 | none | 6.00E−03 | 10.0 | 230 |
| 1st | Ta2O5 | 2.04 | Higher | | 3.00E−02 | none | 3.0 | 100 |
| Substrate | Plastic | | | | | | Total film thickness | 1630 |

TABLE 2

| Layer | Material of layer | Refractive index at 400 nm | Refractive index group | Difference in refractive index between adjacent layers | O2 feeding pressure (Pa) | Ar feeding pressure (Pa) | Layer-forming rate (Å/s) | Layer thickness (Å) (target) |
|---|---|---|---|---|---|---|---|---|
| 4th | SiO2 | 1.46 | Lower | 0.58 | none | 6.00E−03 | 10.0 | 600 |
| 3rd | Ta2O5 | 2.04 | Higher | −0.58 | 3.00E−02 | none | 3.0 | 700 |
| 2nd | SiO2 | 1.46 | Lower | 0.58 | none | 6.00E−03 | 10.0 | 230 |
| 1st | Ta2O5 | 2.04 | Higher | | 3.00E−02 | none | 3.0 | 100 |
| Substrate | Glass | | | | | | Total film thickness | 1630 |

TABLE 3

| Layer | Material of layer | Refractive index at 400 nm | Refractive index group | Difference in refractive index between adjacent layers | O2 feeding pressure (Pa) | Ar feeding pressure (Pa) | Layer-forming rate (Å/s) | Layer thickness (Å) (target) |
|---|---|---|---|---|---|---|---|---|
| 5th | SiO2 | 1.46 | Lower | 0.56 | none | 6.00E−03 | 10.0 | 440 |
| 4th | ZrO2 | 2.02 | Higher | −0.56 | 1.00E−02 | none | 4.0 | 150 |
| 3rd | SiO2 | 1.46 | Lower | 0.56 | none | 6.00E−03 | 10.0 | 440 |
| 2nd | ZrO2 | 2.02 | Higher | −0.56 | 1.00E−02 | none | 4.0 | 150 |
| 1st | SiO2 | 1.46 | Lower | | none | 6.00E−03 | 10.0 | 390 |
| Substrate | Plastic | | | | | | Total film thickness | 1570 |

TABLE 4

| Layer | Material of layer | Refractive index at 400 nm | Refractive index group | Difference in refractive index between adjacent layers | O2 feeding pressure (Pa) | Ar feeding pressure (Pa) | Layer-forming rate (Å/s) | Layer thickness (Å) (target) |
|---|---|---|---|---|---|---|---|---|
| 5th | SiO2 | 1.46 | Lower | 0.32 | none | 6.00E−03 | 10.0 | 740 |
| 4th | LaxAlyOz | 1.78 | Medium | −0.32 | none | 6.00E−03 | 4.0 | 550 |
| 3rd | SiO2 | 1.46 | Lower | 0.32 | none | 6.00E−03 | 10.0 | 560 |
| 2nd | LaxAlyOz | 1.78 | Medium | −0.32 | none | 6.00E−03 | 4.0 | 100 |
| 1st | SiO2 | 1.46 | Lower | | none | 6.00E−03 | 10.0 | 460 |
| Substrate | Plastic | | | | | | Total film thickness | 2410 |

TABLE 5

| Layer | Material of layer | Refractive index at 400 nm | Refractive index group | Difference in refractive index between adjacent layers | O2 feeding pressure (Pa) | Ar feeding pressure (Pa) | Layer-forming rate (Å/s) | Layer thickness (Å) (target) |
|---|---|---|---|---|---|---|---|---|
| 4th | SiO2 | 1.46 | Lower | 0.32 | none | 6.00E−03 | 10.0 | 1200 |
| 3rd | La$x$Al$y$O$z$ | 1.78 | Medium | −0.32 | none | 6.00E−03 | 4.0 | 550 |
| 2nd | SiO2 | 1.46 | Lower | 0.32 | none | 6.00E−03 | 10.0 | 560 |
| 1st | La$x$Al$y$O$z$ | 1.78 | Medium |  | none | 6.00E−03 | 4.0 | 100 |
| Substrate | Plastic |  |  |  |  |  | Total film thickness | 2410 |

TABLE 6

| Layer | Material of layer | Refractive index at 400 nm | Refractive index group | Difference in refractive index between adjacent layers | O2 feeding pressure (Pa) | Ar feeding pressure (Pa) | Layer-forming rate (Å/s) | Layer thickness (Å) (target) |
|---|---|---|---|---|---|---|---|---|
| 13th | SiO2 | 1.46 | Lower | 0.32 | none | 6.00E−03 | 10.0 | 570 |
| 12th | La$x$Al$y$O$z$ | 1.78 | Medium | −0.32 | none | 6.00E−03 | 4.0 | 90 |
| 11th | SiO2 | 1.46 | Lower | 0.32 | none | 6.00E−03 | 10.0 | 150 |
| 10th | La$x$Al$y$O$z$ | 1.78 | Medium | −0.32 | none | 6.00E−03 | 4.0 | 350 |
| 9th | SiO2 | 1.46 | Lower | 0.32 | none | 6.00E−03 | 10.0 | 150 |
| 8th | La$x$Al$y$O$z$ | 1.78 | Medium | −0.32 | none | 6.00E−03 | 4.0 | 90 |
| 7th | SiO2 | 1.46 | Lower | 0.32 | none | 6.00E−03 | 10.0 | 500 |
| 6th | La$x$Al$y$O$z$ | 1.78 | Medium | −0.32 | none | 6.00E−03 | 4.0 | 440 |
| 5th | SiO2 | 1.46 | Lower | 0.32 | none | 6.00E−03 | 10.0 | 160 |
| 4th | La$x$Al$y$O$z$ | 1.78 | Medium | −0.32 | none | 6.00E−03 | 4.0 | 240 |
| 3rd | SiO2 | 1.46 | Lower | 0.32 | none | 6.00E−03 | 10.0 | 160 |
| 2nd | La$x$Al$y$O$z$ | 1.78 | Medium | −0.32 | none | 6.00E−03 | 4.0 | 80 |
| 1st | SiO2 | 1.46 | Lower |  | none | 6.00E−03 | 10.0 | 640 |
| Substrate | Plastic |  |  |  |  |  | Total film thickness | 3620 |

TABLE 7

| Layer | Material of layer | Refractive index at 400 nm | Refractive index group | Difference in refractive index between adjacent layers | O2 feeding pressure (Pa) | Ar feeding pressure (Pa) | Layer-forming rate (Å/s) | Layer thickness (Å) (target) |
|---|---|---|---|---|---|---|---|---|
| 5th | SiO2 | 1.46 | Lower | 0.38 | none | 6.00E−03 | 10.0 | 700 |
| 4th | Gd2O3 | 1.84 | Medium | −0.38 | none | 6.00E−03 | 4.0 | 600 |
| 3rd | SiO2 | 1.46 | Lower | 0.38 | none | 6.00E−03 | 10.0 | 420 |
| 2nd | Gd2O3 | 1.84 | Medium | −0.38 | none | 6.00E−03 | 4.0 | 100 |
| 1st | SiO2 | 1.46 | Lower |  | none | 6.00E−03 | 10.0 | 610 |
| Substrate | Plastic |  |  |  |  |  | Total film thickness | 2430 |

TABLE 8

| Layer | Material of layer | Refractive index at 400 nm | Refractive index group | Difference in refractive index between adjacent layers | O2 feeding pressure (Pa) | Ar feeding pressure (Pa) | Layer-forming rate (Å/s) | Layer thickness (Å) (target) |
|---|---|---|---|---|---|---|---|---|
| 6th | SiO2 | 1.46 | Lower | 0.21 | 6.00E−03 | none | 10.0 | 700 |
| 5th | AlON | 1.67 | Medium | −0.21 | none | 1.00E−02 | 0.5 | 620 |
| 4th | SiO2 | 1.46 | Lower | 0.21 | 6.00E−03 | none | 10.0 | 730 |
| 3rd | AlON | 1.67 | Medium | −0.21 | none | 1.00E−02 | 0.5 | 550 |
| 2nd | SiO2 | 1.46 | Lower | 0.21 | 6.00E−03 | none | 10.0 | 140 |
| 1st | AlON | 1.67 | Medium |  | none | 1.00E−02 | 0.5 | 420 |
| Substrate | Plastic |  |  |  |  |  | Total film thickness | 3160 |

TABLE 9

| Layer | Material of layer | Refractive index at 400 nm | Refractive index group | Difference in refractive index between adjacent layers | O2 feeding pressure (Pa) | Ar feeding pressure (Pa) | Layer-forming rate (Å/s) | Layer thickness (Å) (target) |
|---|---|---|---|---|---|---|---|---|
| 6th | SiO2 | 1.46 | Lower | 0.32 | none | 6.00E−03 | 10.0 | 700 |
| 5th | LaxAlyOz | 1.78 | Medium | −0.32 | none | 6.00E−03 | 4.0 | 580 |
| 4th | SiO2 | 1.46 | Lower | 0.32 | none | 6.00E−03 | 10.0 | 760 |
| 3rd | LaxAlyOz | 1.78 | Medium | −0.32 | none | 6.00E−03 | 4.0 | 140 |
| 2nd | SiO2 | 1.46 | Lower | 0.2 | none | 6.00E−03 | 10.0 | 400 |
| 1st | Al2O3 | 1.66 | Medium | | none | 6.00E−03 | 5.0 | 420 |
| Substrate | Plastic | | | | | | Total film thickness | 3000 |

TABLE 10

| Layer | Material of layer | Refractive index at 400 nm | Refractive index group | Difference in refractive index between adjacent layers | O2 feeding pressure (Pa) | Ar feeding pressure (Pa) | Layer-forming rate (Å/s) | Layer thickness (Å) (target) |
|---|---|---|---|---|---|---|---|---|
| 12th | SiO2 | 1.46 | Lower | 0.38 | none | 6.00E−03 | 20.0 | 1100 |
| 11th | Gd2O3 | 1.84 | Medium | −0.38 | none | 6.00E−03 | 4.0 | 300 |
| 10th | SiO2 | 1.46 | Lower | 0.38 | none | 6.00E−03 | 20.0 | 120 |
| 9th | Gd2O3 | 1.84 | Medium | −0.38 | none | 6.00E−03 | 4.0 | 280 |
| 8th | SiO2 | 1.46 | Lower | 0.38 | none | 6.00E−03 | 20.0 | 60 |
| 7th | Gd2O3 | 1.84 | Medium | −0.38 | none | 6.00E−03 | 4.0 | 500 |
| 6th | SiO2 | 1.46 | Lower | 0.38 | none | 6.00E−03 | 20.0 | 990 |
| 5th | Gd2O3 | 1.84 | Medium | −0.38 | none | 6.00E−03 | 4.0 | 90 |
| 4th | SiO2 | 1.46 | Lower | 0.38 | none | 6.00E−03 | 20.0 | 1040 |
| 3rd | Gd2O3 | 1.84 | Medium | −0.38 | none | 6.00E−03 | 4.0 | 80 |
| 2nd | SiO2 | 1.46 | Lower | 0.2 | none | 6.00E−03 | 20.0 | 590 |
| 1st | Al2O3 | 1.66 | Medium | | none | 6.00E−03 | 5.0 | 370 |
| Substrate | Plastic | | | | | | Total film thickness | 5520 |

TABLE 11

| Layer | Material of layer | Refractive index at 400 nm | Refractive index group | Difference in refractive index between adjacent layers | O2 feeding pressure (Pa) | Ar feeding pressure (Pa) | Layer-forming rate (Å/s) | Layer thickness (Å) (target) |
|---|---|---|---|---|---|---|---|---|
| 21st | SiO2 | 1.46 | Lower | 0.2 | none | 6.00E−03 | 20.0 | 1100 |
| 20th | Al2O3 | 1.66 | Medium | 0.36 | none | 6.00E−03 | 5.0 | 80 |
| 19th | ZrO2 | 2.02 | Higher | −0.36 | 1.00E−02 | none | 4.0 | 280 |
| 18th | Al2O3 | 1.66 | Medium | −0.2 | none | 6.00E−03 | 5.0 | 80 |
| 17th | SiO2 | 1.46 | Lower | 0.2 | none | 6.00E−03 | 20.0 | 100 |
| 16th | Al2O3 | 1.66 | Medium | 0.36 | none | 6.00E−03 | 5.0 | 80 |
| 15th | ZrO2 | 2.02 | Higher | −0.36 | 1.00E−02 | none | 4.0 | 580 |
| 14th | Al2O3 | 1.66 | Medium | −0.2 | none | 6.00E−03 | 5.0 | 120 |
| 13th | SiO2 | 1.46 | Lower | 0.2 | none | 6.00E−03 | 20.0 | 690 |
| 12th | Al2O3 | 1.66 | Medium | 0.36 | none | 6.00E−03 | 5.0 | 70 |
| 11th | ZrO2 | 2.02 | Higher | −0.36 | 1.00E−02 | none | 4.0 | 150 |
| 10th | Al2O3 | 1.66 | Medium | −0.2 | none | 6.00E−03 | 5.0 | 180 |
| 9th | SiO2 | 1.46 | Lower | 0.2 | none | 6.00E−03 | 20.0 | 470 |
| 8th | Al2O3 | 1.66 | Medium | 0.36 | none | 6.00E−03 | 5.0 | 190 |
| 7th | ZrO2 | 2.02 | Higher | −0.36 | 1.00E−02 | none | 4.0 | 100 |
| 6th | Al2O3 | 1.66 | Medium | −0.2 | none | 6.00E−03 | 5.0 | 130 |
| 5th | SiO2 | 1.46 | Lower | 0.2 | none | 6.00E−03 | 20.0 | 440 |
| 4th | Al2O3 | 1.66 | Medium | 0.36 | none | 6.00E−03 | 5.0 | 180 |
| 3rd | ZrO2 | 2.02 | Higher | −0.36 | 1.00E−02 | none | 4.0 | 150 |
| 2nd | Al2O3 | 1.66 | Medium | −0.2 | none | 6.00E−03 | 5.0 | 190 |
| 1st | SiO2 | 1.46 | Lower | | none | 6.00E−03 | 20.0 | 390 |
| Substrate | Plastic | | | | | | Total film thickness | 5750 |

Table 12 shows resistance against lights in the ultraviolet region including blue lasers of multi-layered optical films No. 1 to No. 11. As an index of resistance against lasers, a difference in wave aberration measured before the laser irradiation under the predetermined conditions and that after the irradiation was measured. In Table 12 and the other tables described below, wave aberration is represented by standard deviation in unit of one thousandth (1/1000) of wavelength (mλ). Further, in Table 12, x, y and z of LaxAlyOz represent positive numbers.

TABLE 12

| Film No. | | Difference in wave aberration before and after irradiation of 60 Whr (mλ) | Film structure | Number of layers | Total film thickness (nm) |
|---|---|---|---|---|---|
| 1 | Film made of Ta2O5—SiO2 (plastic substrate) | 37 | (Ta2O5—SiO2)^2 | 4 | 160 |
| 2 | Film made of Ta2O5—SiO2 (glass substrate) | 6 | (Ta2O5—SiO2)^2 | 4 | 160 |
| 3 | Film made of SiO2—ZrO2 (plastic substrate) | 28 | (SiO2—ZrO2)^2—SiO2 | 5 | 160 |
| 4 | Film made of SiO2—LaxAlyOz(thinner) (plastic substrate) | 20 | (SiO2—LaxAlyOz)^2—SiO2 | 5 | 240 |
| 5 | Film made of LaxAlyOz—SiO2 (plastic substrat) | 25 | (LaxAlyOz—SiO2)^2 | 4 | 240 |
| 6 | Film made of SiO2—LaxAlyOz(thicker) (plastic substrate) | 12 | (SiO2—LaxAlyOz)^6—SiO2 | 13 | 360 |
| 7 | Film made of SiO2—Gd2O3 (plastic substrate) | 8 | (SiO2—Gd2O3)^2—SiO2 | 5 | 240 |
| 8 | Film made of AlON—SiO2 (plastic substrate) | 9 | (AlON—SiO2)^3 | 6 | 320 |
| 9 | Film made of Al2O3—SiO2—LaxAlyOz (plastic substrate) | 3 | Al2O3—(SiO2—LaxAlyOz)^2—SiO2 | 6 | 300 |
| 10 | Film made of Al2O3—SiO2—Gd2O3 (plastic substrate) | 9 | Al2O3—(SiO2—Gd2O3)^5—SiO2 | 12 | 550 |
| 11 | Film made of SiO2—Al2O3—ZrO2 (plastic substrate) | 11 | (SiO2—Al2O3—ZrO2—Al2O3)^5—SiO2 | 21 | 580 |

Table 13 shows the above-described predetermined conditions The multi-layered optical film was irradiated with laser of wavelength of 405 nanometers at ambient temperature of 75° C. for 1000 hours. The irradiation was performed in such a way that energy density at the irradiated surface of the multi-layered optical film is 60 mW/mm². The total energy of light is 60 Whr (watt-hours). This value of the total energy is great enough to evaluate resistance of optical elements for general use.

Similar results were obtained for light in the wavelength range from 300 nanometers to 450 nanometers.

Detailed description on ambient temperature of the irradiation test will be given below. By way of example, as to an optical device provided with multi-layered optical film No. 1 shown in Table 12, a difference between wave aberration before laser irradiation of 60 Whr performed under the conditions shown in Table 13 and that after the laser irradiation is 37 mλ. As to the same optical device provided with multi-layered optical film No. 1, the difference caused by laser irradiation of 60 Whr, is 2 mλ when ambient temperature alone is changed to 25° C. in the conditions shown in Table 13. Thus, some optical devices provided with a multi-layered optical film which show little difference in wave aberration when ambient temperature of the irradiation test is 25° C., show a remarkable difference in wave aberration when ambient temperature of the irradiation test is 75° C. Conventionally, an optical element provided with a multi-layered optical film which has a sufficient resistance against lights in the ultraviolet region including blue lasers even for ambient temperature of the irradiation test of 75° C. has not been developed. Ambient temperature of the irradiation test of 75° C. is high enough to evaluate resistance of optical elements for general use. In contrast to this embodiment, in the multi-layered optical films described in JP4178190, ambient temperature of the laser irradiation test is 25° C. and therefore resistance in a high ambient temperature such as 75° C. has not been taken into consideration.

The present invention is intended to provide a multi-layered optical film which shows little difference between wave aberration before blue laser irradiation and that after blue laser irradiation even when ambient temperature of the irradiation test is 75° C.

TABLE 13

| | |
|---|---|
| Light source used | Laser diode of wavelength of 405 nm |
| Energy density | 60 mW/mm2 |
| Irradiation time | 0 hr~1000 hr (Total energy of light for 1000 hr is 60 Whr) |
| Ambient temperature of irradiation test | 75° C. |

For example, as to some optical elements of optical pickup devices, resistance of total energy of light of 60 Whr at ambient temperature of 75° C. is required. On the other hand, as to many optical elements of optical pickup devices, wave aberration of transmitted light of 25 mλ or less is required. Since in optical elements, there exists wave aberration of approximately 5 mλ at the beginning, a difference between wave aberration before blue laser irradiation and that after blue laser irradiation is required to be 20 mλ or less.

As shown in Tables 1 and 2, multi-layered optical film No. 1 and multi-layered optical film No. 2 have the same structure except that the substrate of multi-layered optical film No. 1 is made of plastic while the substrate of multi-layered optical film No. 2 is made of glass. When in Table 12 a difference between wave aberration before blue laser irradiation and that after blue laser irradiation of multi-layered optical film No. 1 and that of multi-layered optical film No. 2 are compared with each other, the difference in wave aberration of multi-layered optical film No. 1 is much greater than that of multi-layered optical film No. 2. In general, resistance against lights in the ultraviolet region including blue lasers of a multi-layered optical film formed on a plastic substrate is remarkably lower than that of a multi-layered optical film formed on a glass substrate. The reason is presumed to be that chemical reactions such as catalytic reaction is generated through the interface between the plastic substrate and the multi-layered optical film. In other words, it is presumed that when chemical reactions are likely to occur when irradiated with laser, the multi-layered optical film will be heavily damaged by the laser.

Based on the results in Table 12, it will be described which factors affect resistance against laser of a multi-layered optical film.

Figure 4:
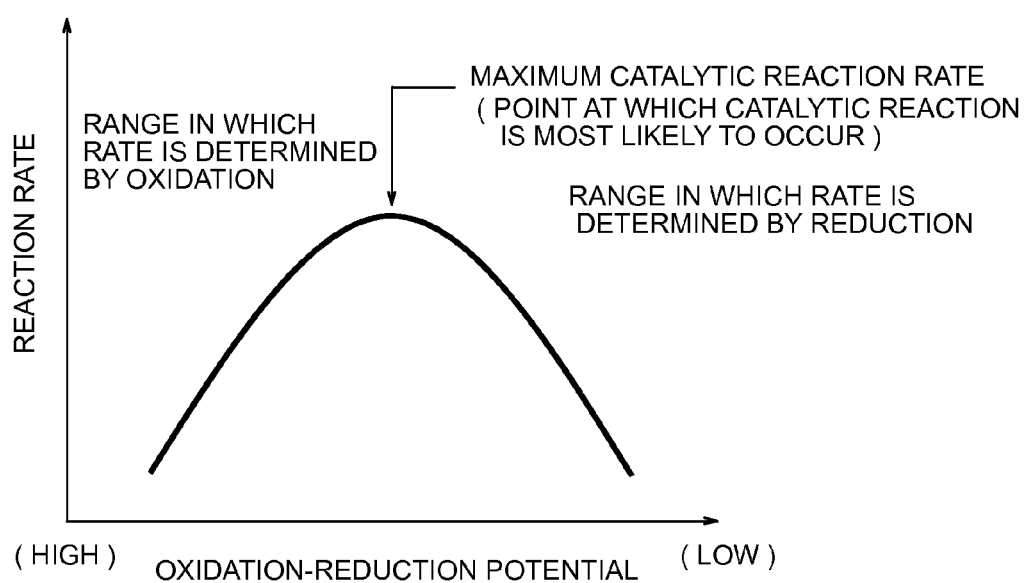
FIG. 4 shows a general relationship between oxidation-reduction potential and reaction rate of elements.

FIG. 4 shows a general relationship between oxidation-reduction potential and reaction rate of elements. The horizontal axis of FIG. 4 represents oxidation-reduction potential. As a point moves from the right to the left along the horizontal axis, oxidation-reduction potential will increase. The vertical axis of FIG. 4 shows reaction rate (likelihood of occurrence of reaction) of oxidation or reduction.

Table 14 shows values of oxidation-reduction potential of elements.

As described above, a multi-layered optical film is presumed to be heavily damaged when the multi-layered optical film is likely to undergo chemical reactions by laser irradiation. Accordingly, when oxides of elements having lower oxidation-reduction potential are used as materials which constitute the multi-layered optical film, damage of the multi-layered optical film caused by laser is presumed to be lessened, because reaction rate of the elements having lower oxidation-reduction potential is small in the range in which the rate is determined by reduction.

Table 15A shows a relationship between oxidation-reduction potential of elements which constitutes oxides or oxynitrides besides silicon dioxide among the oxides or oxynitrides which constitute the multi-layered optical films and difference between wave aberration before laser irradiation and that after laser irradiation of the multi-layered optical films. In Table 15A, oxidation-reduction potential of elements which constitutes oxides besides silicon dioxide among the oxides which constitute multi-layered optical film 4, is set to an average of oxidation-reduction potential of La (lanthanum) and that of Al (aluminium).

Figure 5:
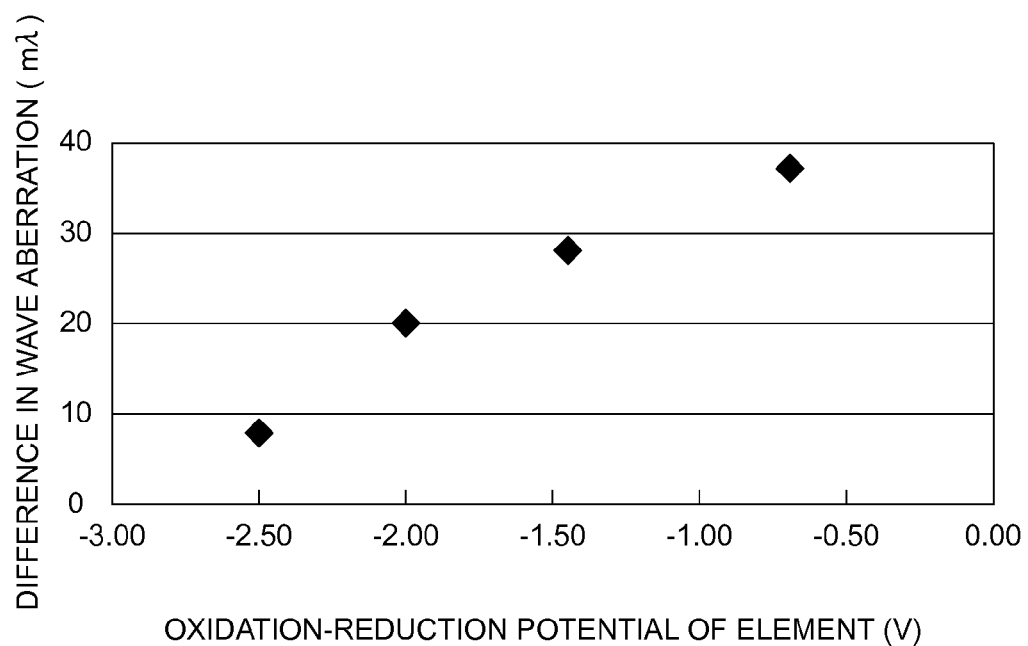
FIG. 5 shows a relationship between oxidation-reduction potential of elements which constitutes oxides or oxynitrides besides silicon dioxide among the oxides or oxynitrides which constitute the multi-layered optical films and difference between wave aberration of transmitted light before laser irradiation and that after laser irradiation of the multi-layered optical films.

FIG. 5 shows a relationship between oxidation-reduction potential of elements which constitutes oxides or oxynitrides besides silicon dioxide among the oxides or oxynitrides which constitute the multi-layered optical films and difference between wave aberration before laser irradiation and that after laser irradiation of the multi-layered optical films. The lower oxidation-reduction potential of elements, the smaller difference in wave aberration is. Taking into consideration that oxidation-reduction potential of silicon is −0.9 volts or less, oxidation-reduction potential of elements which constitutes oxides or oxynitrides should preferably be −0.9 volts or less. Elements oxidation-reduction potential of which is −0.9 volts or less include zirconium, aluminium, lanthanum, gadolinium, barium and lithium. These elements have one ionic charge number alone and presumed to be less likely to generate chemical reaction when irradiated with laser than elements having plural ionic charge numbers.

TABLE 14

| Element | Au | Pt | Pd | Cu | As | H | Fe | Ta | Ti | Si | Zr | Al | La | Gd | Ba | Li |
|---|---|---|---|---|---|---|---|---|---|---|---|---|---|---|---|---|
| Standard oxidation-reduction potential (V) | 1.52 | 1.12 | 0.92 | 0.34 | 0.25 | 0.00 | −0.04 ~ −0.44 | −0.6 ~ −0.81 | −0.56 ~ −1.63 | −0.9 ~ −1.5 | −1.45 | −1.66 | −2.34 ~ −3.0 | −2.0 | −2.91 | −3.04 |

TABLE 15A

| Film No. | Oxidation-reduction potential of metal consisting oxide excluding SiO2 (V) | Filim structure | Difference in wave aberration before and after irradiation of 60 Whr (mλ) |
|---|---|---|---|
| 1 | −0.70 | (Ta2O5—SiO2)^2 | 37 |
| 3 | −1.45 | (SiO2—ZrO2)^2—SiO2 | 28 |
| 4 | −2.00 | (SiO2—LaxAlyOz)^2—SiO2 | 20 |
| 7 | −2.50 | (SiO2—Gd2O3)^2—SiO2 | 8 |

Table 15 B shows other elements oxidation-reduction potential of which is −0.9 volts or less and their oxides. The elements are calcium, cerium, europium, hafnium, magnesium, niobium, scandium, yttrium and ytterbium. These oxides can be used as materials of medium refractive index or those of higher refractive index.

TABLE 15B

| Element | Ca | Ce | Eu | Hf | Mg | Nb | Sc | Y | Yb |
|---|---|---|---|---|---|---|---|---|---|
| Oxidation-reduction potential (V) | −2.8 | −2.3 | −2.0 | −1.7 | −2.4 | −1.1 | −2.0 | −2.4 | −2.2 |
| Oxide | CaO | CeO2 | Eu2O3 | HfO2 | MgO | Nb2O5 | Sc2O2 | Y2O3 | Yb2O3 |
| Refractive index | 1.8 | 2.2 | 1.9 | 1.9 | 1.8 | 2.2 | 1.9 | 1.9 | 1.9 |

Table 16 shows a relationship between a difference (absolute value) between refractive index of the first layer and that of the substrate and a difference between wave aberration of transmitted light before laser irradiation and that after laser irradiation. The first layer means the layer which is adjacent to the substrate.

Figure 6:
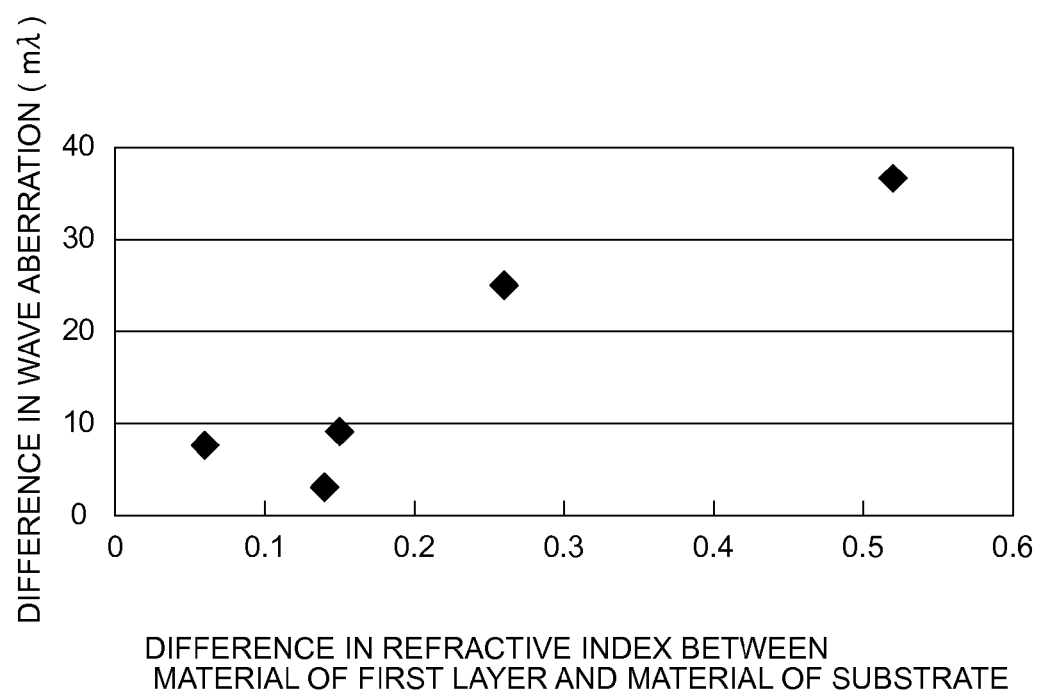
FIG. 6 shows a relationship between a difference (absolute value) between refractive index of the first layer and that of the substrate and a difference between wave aberration of transmitted light before laser irradiation and that after laser irradiation.

FIG. 6 shows a relationship between a difference (absolute value) between refractive index of the first layer of the multi-layered optical film and that of the substrate and a difference between wave aberration of transmitted light before laser irradiation and that after laser irradiation.

the multi-layered optical film and a difference between wave aberration of transmitted light before laser irradiation and that after laser irradiation. As described above, in many cases, at least one kind of pair of layers in which a layer made of a material having a higher refractive index and a layer made of a material having a lower refractive index are alternately stacked is stacked to form the multi-layered optical film. The difference in refractive index (absolute value) between adjacent layers of the multi-layered optical film means a difference between the higher refractive index and the lower refractive index. In table 17, as to multi-layered optical film No. 11, a difference in refractive index (absolute value) between $Al_2O_3$ and $SiO_2$ and that between $ZrO_2$ and $SiO_2$ are represented respectively as 0.20 and 0.36.

Figure 7:
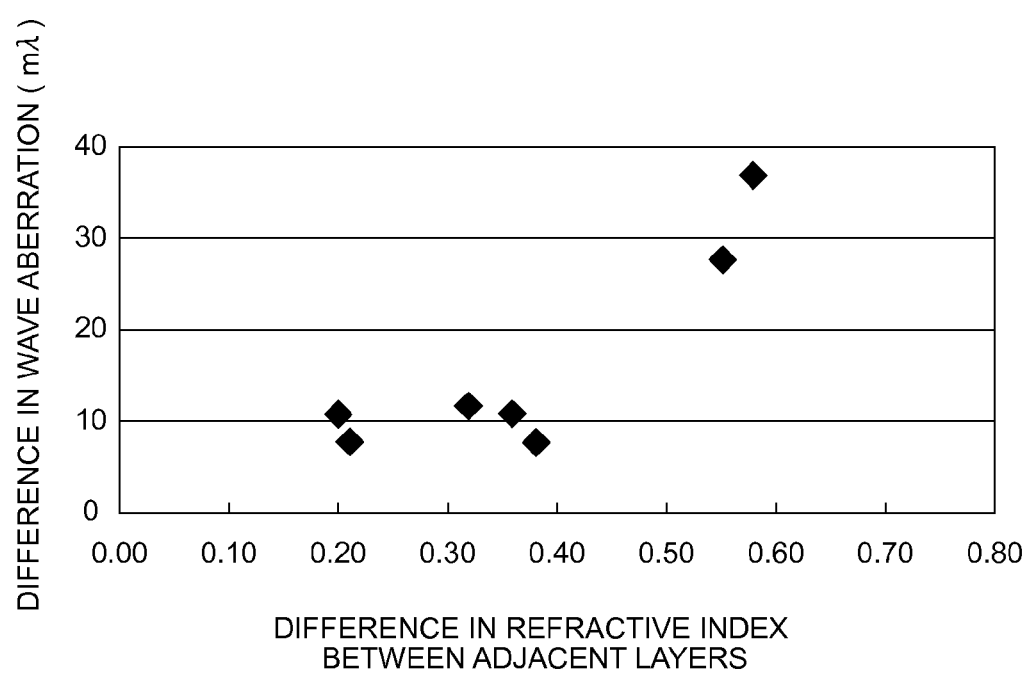
FIG. 7 shows a relationship between a difference in refractive index (absolute value) between adjacent layers of the multi-layered optical film and a difference between wave aberration of transmitted light before laser irradiation and that after laser irradiation.

FIG. 7 shows a relationship between a difference in refractive index (absolute value) between adjacent layers of the multi-layered optical film and a difference between wave aberration of transmitted light before laser irradiation and that after laser irradiation.

TABLE 16

| Film No. | Difference in refractive index | Film structure | Difference in wave aberration before and after irradiation of 60 Whr (mλ) |
|---|---|---|---|
| 7 | 0.06 | (SiO2—Gd2O3)^2—SiO2 | 8 |
| 9 | 0.14 | Al2O3—(SiO2—LaxAlyOz)^2—SiO2 | 3 |
| 8 | 0.15 | (AlON—SiO2)^3 | 9 |
| 5 | 0.26 | (LaxAlyOz—SiO2)^2 | 25 |
| 1 | 0.52 | (Ta2O5—SiO2)^2 | 37 |

As shown in Table 16 and FIG. 6, when a difference (absolute value) between refractive index of the first layer and that of the substrate is 0.2 or less, a difference in wave aberration is 10 (mλ) or less. Refractive index of the material of the substrate is 1.52. Thickness of the first layer must be set to 10 nanometers or more to ensure adhesion with the substrate.

Table 17 shows a relationship between a difference in refractive index (absolute value) between adjacent layers of

TABLE 17

| Film No. | Difference in refractive index between adjacent layers | Film structure | Difference in wave aberration before and after irradiation of 60 Whr (mλ) |
|---|---|---|---|
| 7 | 0.21 | (SiO2—Gd2O3)^2—SiO2 | 8 |
| 11 | 0.20 | (SiO2—Al2O3—ZrO2—Al2O3)^5—SiO2 | 11 |
|  | 0.36 |  | 11 |
| 6 | 0.32 | (SiO2—LaxAlyOz)^6—SiO2 | 12 |
| 7 | 0.38 | (SiO2—Gd2O3)^2—SiO2 | 8 |
| 3 | 0.55 | (SiO2—ZrO2)^2—SiO2 | 28 |
| 1 | 0.58 | (Ta2O5—SiO2)^2 | 37 |

As shown in Table 17 and FIG. 7, when a difference in refractive index (absolute value) between adjacent layers of the multi-layered optical film is 0.40 or less, a difference in wave aberration is 12 (mλ) or less. In general, when a difference in refractive index (absolute value) between adjacent layers of the multi-layered optical film is 0.45 or less, a difference in wave aberration is a sufficiently small value.

The reason why the multi-layered optical film suffers severe deterioration when a difference in refractive index (absolute value) between adjacent layers of the multi-layered optical film is great is presumed as below. Interface state is generated at the interface between a layer of higher refractive index which is more likely to be crystallized and a layer of lower refractive index which is less likely to be crystallized. Accordingly, a possibility that the interface state releases or absorbs energy will increase. As a consequence, deterioration of the interface is accelerated particularly by ultraviolet radiation emission, and the interface is thermally damaged by the absorption.

Table 18 shows a relationship between total thickness of the multi-layered optical film and a difference between wave aberration of transmitted light before laser irradiation and that after laser irradiation.

Figure 8:
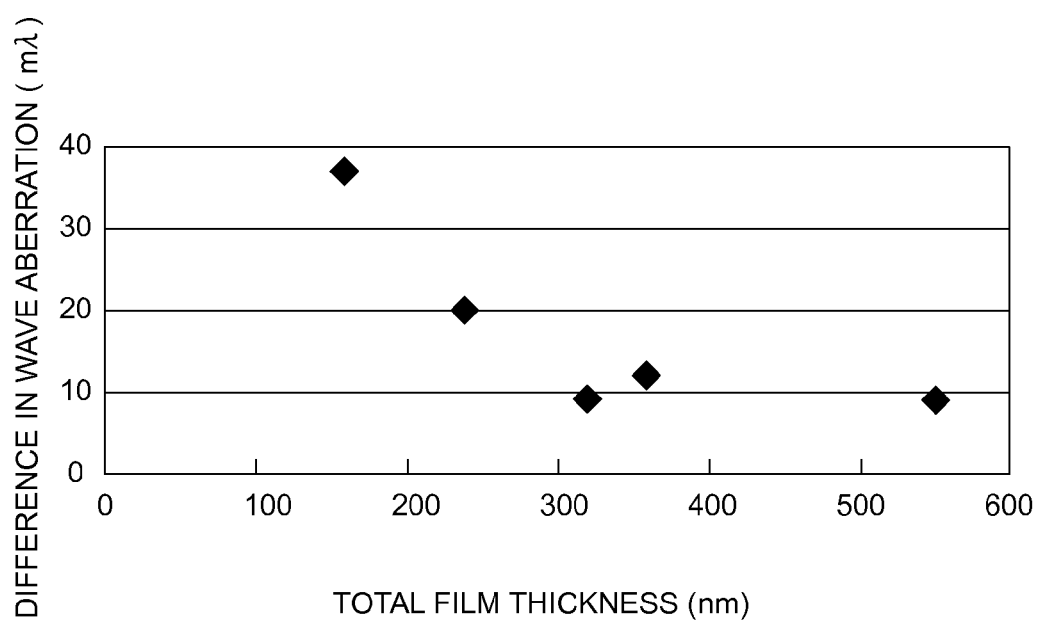
FIG. 8 shows a relationship between total thickness of the multi-layered optical film and a difference between wave aberration of transmitted light before laser irradiation and that after laser irradiation.

FIG. 8 shows a relationship between total thickness of the multi-layered optical film and a difference between wave aberration of transmitted light before laser irradiation and that after laser irradiation.

TABLE 18

| Film No. | Total film thickness (nm) | Film structure | Difference in wave aberration before and after irradiation of 60 Whr (mλ) |
|---|---|---|---|
| 1 | 160 | (Ta2O5—SiO2)^2 | 37 |
| 4 | 240 | (SiO2—LaxAlyOz)^2—SiO2 | 20 |
| 8 | 320 | (AlON—SiO2)^3 | 9 |
| 6 | 360 | (SiO2—LaxAlyOz)^6—SiO2 | 12 |
| 10 | 550 | Al2O3—(SiO2—Gd2O3)^5—SiO2 | 9 |
| 11 | 580 | (SiO2—Al2O3—ZrO2—Al2O3)^5—SiO2 | 11 |

As shown in Table 18 and FIG. 8, as to multi-layered optical film No. 4 which satisfies the conditions obtained through Table 15A to Table 17 and total film thickness of which is 240 nanometers, the difference between wave aberration of transmitted light before laser irradiation and that after laser irradiation is 20 (mλ). As to multi-layered optical film No. 6 which has a similar structure and total film thickness of which is 360 nanometers, the difference between wave aberration of transmitted light before laser irradiation and that after laser irradiation is 12 (mλ). Accordingly, total film thickness should preferably be 240 nanometers or more.

The conditions for enhancing resistance against lights in the ultraviolet region including blue lasers of a multi-layered optical film are summarized below.

Each layer of the multi-layered optical film is made of an oxide or an oxynitride.

Oxidation-reduction potential of elements which constitutes oxides or oxynitrides should preferably be −0.9 volts or less. Elements which satisfy the above-described condition include aluminium, lanthanum, gadolinium, zirconium, calcium, cerium, europium, hafnium, magnesium, niobium, scandium, yttrium and ytterbium.

A difference (absolute value) between refractive index of the first layer and that of the substrate should preferably be 0.2 or less. When a material of the substrate is cyclo-olefin polymer, refractive index of which is 1.52 at wavelength of 400 nanometers, materials for the first layer which satisfy the above-described condition include silicon dioxide (SiO$_2$), aluminium oxynitride (AlON) and aluminium oxide (Al$_2$O$_3$).

A difference in refractive index (absolute value) between adjacent layers of the multi-layered optical film should preferably be 0.45 or less.

Total film thickness of the multi-layered optical film should preferably be 240 nanometers or more.

In general, when a multi-layered optical film in which a layer of a material having higher refractive index and a layer of a material having lower refractive index are arranged adjacent to each other is used to obtain predetermined optical characteristics, the greater the difference in refractive index (absolute value) between the adjacent layers, the smaller is the number of required layers. Accordingly, particularly when a multi-layered optical film is formed by a complicated vacuum forming method, a value of a difference in refractive index (absolute value) between the adjacent layers tends to be great in design.

However, a multi-layered optical film which has a high resistance against lights in the ultraviolet region including blue lasers even in a high ambient temperature can be obtained when differences in refractive index (absolute values) between a material of the substrate and materials of layers are set to values less than predetermined ones. This is based on the new finding of the inventors of the present application that differences in refractive index (absolute values) between a material of the substrate and materials of layers have a remarkable influence over resistance against lights in the ultraviolet region including blue lasers of a multi-layered optical film at a high ambient temperature.

What is claimed is:

1. A multi-layered optical film formed on a plastic substrate, wherein each layer of the multi-layered optical film is made of an oxide or an oxynitride, layers adjacent to each other are made of two kinds of materials having different refractive indexes, oxidation-reduction potential of elements constituting oxides or oxynitrides is −0.9 volts or less, thickness of a first layer adjacent to the substrate is 10 nanometers or more, an absolute value of a difference in refractive index between a material of the substrate and a material of the first layer is 0.2 or less, an absolute value of a difference in refractive index between the two kinds of materials of all two layers that are adjacent to each other is 0.4 or less and total thickness of the multi-layered optical film is 3000 nanometers or less.

2. A multi-layered optical film according to claim 1, wherein the two kinds of materials are a material having a refractive index of a first group and a material having a refractive index of a second group, or are a material having a refractive index of the second group and a material having a refractive index of a third group, refractive indexes of the first group being less than 1 5, refractive indexes of the second group being 1.5 or more and less than 1.9 and refractive indexes of the third group being 1.9 or more.

3. A multi-layered optical film according to claim 1, wherein material with the highest refractive index among materials constituting the multi-layered optical film includes one of aluminium, lanthanum, gadolinium, zirconium, calcium, cerium, europium, hafnium, magnesium, niobium, scandium, yttrium and ytterbium.

4. A multi-layered optical film according to claim 1, wherein material constituting the first layer of the multi-layered optical film includes silicon or aluminium.

5. A multi-layered optical film according to claim 1, wherein the multi-layered optical film includes two kinds of materials.

6. A multi-layered optical film according to claim 1, wherein the multi-layered optical film includes three kinds of materials.

7. A multi-layered optical film according to claim 1, wherein total thickness of the multi-layered optical film is 240 nanometers or more.

8. An optical element including a plastic substrate and a multi-layered optical film formed on the plastic substrate according to claim 1.

9. A method for forming a multi-layered optical film on a plastic substrate, wherein each layer of the multi-layered optical film is made of an oxide or an oxynitride, layers adjacent to each other are made of two kinds of materials having different refractive indexes, oxidation-reduction potential of elements constituting oxides or oxynitrides is −0.9 volts or less, thickness of a first layer adjacent to the substrate is 10 nanometers or more, an absolute value of a difference in refractive index between a material of the substrate and a material of the first layer is 0.2 or less, an absolute value of a difference in refractive index between the two kinds of materials of all two layers that are adjacent to each other is 0.4 or less and total thickness of the multi-layered optical film is 3000 nanometers or less, the method comprising the steps of:

determining materials, thickness and the number of the layers in such a way that the above-described conditions are satisfied and the multi-layered optical film has a required optical performance; and forming the layers in such a way that the above-described conditions are satisfied.

10. A multi-layered optical film according to claim 2, wherein a layer made of a material having a refractive index of the first group and a layer made of a material having a refractive index of the second group are alternately stacked.

* * * * *